United States Patent [19]

Merkovsky

[11] Patent Number: 5,173,249
[45] Date of Patent: Dec. 22, 1992

[54] FLUX THIMBLE REMOVAL TOOL

[75] Inventor: Daniel Merkovsky, Trafford, Pa.

[73] Assignee: Westinghouse Electric Corp., Pittsburgh, Pa.

[21] Appl. No.: 766,933

[22] Filed: Sep. 27, 1991

[51] Int. Cl.$^5$ .............................................. G21C 19/00
[52] U.S. Cl. ..................................... 376/260; 83/167; 83/277; 83/930
[58] Field of Search .................. 376/260, 254; 83/167, 83/277, 930, 261, 589, 607

[56] References Cited

U.S. PATENT DOCUMENTS

| | | | |
|---|---|---|---|
| 4,223,581 | 9/1980 | Markiewicz | 376/260 |
| 4,377,551 | 3/1983 | Adams | 376/260 |
| 4,664,872 | 5/1987 | Kiewitz et al. | 376/260 |

Primary Examiner—Daniel D. Wasil
Attorney, Agent, or Firm—Walter S. Stevens

[57] ABSTRACT

A flux thimble removal tool includes two basic units: a lower pulling unit 20 and a cutting/storage unit 22 which sits atop the lower pulling unit. Pulling unit 20 houses a gripper unit 30a, drive motor 68, gears 32, 66, helix drive shaft 40a, guide bar 26a, slide bar 24a, and guide tube 36, all of which are adapted to gradually extract neutron flux thimbles 38 one at a time from the reactor vessel 74 of a nuclear reactor, and to feed each thimble to the cutting/storage unit 22. The cutting/storage unit 32 further extracts the thimble, then severs the further extracted portion. The operation is continued until the thimble is fully extracted from the reactor vessel and reduced to a pile of easily-disposable segments.

8 Claims, 4 Drawing Sheets

FLUX THIMBLE REMOVAL TOOL

BACKGROUND OF THE INVENTION

The present invention generally relates to pressurized water nuclear reactors (PWRs). The invention more particularly relates to a tool for extracting, severing and storing irradiated bottom-mounted instrumentation (BMI) flux thimbles from the reactor vessel.

A pressurized water nuclear power station contains a closed loop of pressurized water which heat energy from the core of the PWR and transfers the energy to a second system for generating steam. The steam, in turn, drives a turbine generator which produces electrical power. The PWR consists of a reactor vessel (RV) containing the nuclear fuel which generates the heat energy, a steam generator in which the heat energy is sued to generate team, a circulating pump which circulates the coolant, and a pressurizer that maintains and controls system pressure.

FIG. 1 depicts a typical reactor vessel 74 of a PWR assembly. The reactor vessel 74 has a thermal shield, a core, support plates, control rods, etc. Coolant enters the vessel and flows down an annulus between the core barrel and the vessel wall; in the process in cools the thermal shield. The coolant turns, flows up through the fuel elements and out of the vessel to a steam generator. Neutron flux detectors extend through the bottom head into the core and are combined with thermocouples which measure coolant temperature inside the core; together they are known as "incore instrumentation." The core instrumentation provides data with which the power produced in different regions of the core in calculated.

The fuel rods typically arranged in grids. One assemblage or grid or fuel rods is called a "fuel element assembly", and is the smallest fuel unit handled in a power station. A core is built up by grouping fuel assemblies side-by-side; the higher the power level desired, the more fuel element assemblies are used. Core diameters typically run from 9 to 13 ft. (2.74–3.96 meters), depending on the power level. Core height is typically 10 to 14 ft. (3.05–4.27 meters) for large PWRs.

The neutron flux in the core is measured by the incore instrumentation while the reactor is operating. The flux thimbles 38, which contain the flux detectors, have a first end that extends into the core and a second end that enters a measurement room in the vicinity of the reactor core. The flux thimbles are slidably mounted in BMI guide tubes 36 of great length and are kept in a fixed position during reactor operation. The flux thimbles must be withdrawn from the fuel assemblies when the reactor core is being recharged. In a known embodiment, the flux thimbles pass through fitting on the convex of the RV 74. The guide tubes 36 connected to these fittings form a path, in the shape of a circular arc of large radius, joining the bottom of the RV to the measurement room.

A disadvantage associated with the arrangement just described is that the RV bottom fittings complicate manufacture of the RV and lead to difficulties in observing safety standards. Moreover, the structure of the reactor building must be designed to permit the passage of guide tubes of great length along a circular trajectory, which makes the design and construction of the reactor building more difficult and costly. Furthermore, gaining access to the fittings passing through the bottom of the RV is very difficult, which complicates monitoring these fittings to ensure that the reactor operates in complete safety.

In another known instrumentation arrangement, the flux thimbles pass through the RV closure head. This arrangement avoids the disadvantages described above; however, in an arrangement of this kind, a part of the instrumentation called "upper internal equipment" is carried directly by the closure head, which complicates dismantling the closure head and handling and storing the instrumentation during reactor stoppages. The upper internal equipment is withdrawn and arranged on a storage stand in the reactor pool during recharging and maintenance of the reactor. The arrangements in which the instrumentation guide tubes pass through the closure head make it impossible to simply and quickly handle the upper internal equipment. For further background on PWRs, see "Nuclear Power Plant Systems and Equipment," by K. C. Lish, ISBN 0-8311-1078-3.

The advantages obtained in the design and construction of the reactor when the core instrumentation passes through the RV closure head are thus accompanied by considerable disadvantages in the use and maintenance of the reactor; for this reason most PWRs now in service employ BMI instrumentation tubes. The flux thimbles in a MBI reactor are typically removed by first removing the nuclear fuel and then pulling the thimbles up through the RV and cutting them into pieces under water, which makes it impractical to replace individual thimbles as needed. The object of the present invention is to provide a self-contained tool for extracting and cutting up the thimbles without removing the fuel from the RV.

SUMMARY OF THE INVENTION

According to the invention, a tool for removing a detector thimble from a reactor vessel comprises first pulling means for extracting the thimble from the reactor vessel, and cutting means for severing portions of the thimble. The cutting means is adapted to sever successive portions of the thimble as the thimble is extracted from the reactor vessel. In a preferred embodiment of the invention the first pulling means comprises a first drive shaft, means for rotating the first drive shaft, and first gripper means, coupled to the first drive shaft, for gripping the thimble. The first gripper means is adapted to grip and extract the thimble upon rotation of the first drive shaft in a first predefined direction. The preferred embodiment also comprises second pulling means for receiving the thimble after the thimble is partially extracted by the first pulling means and thereafter further extracting the thimble.

Another embodiment of the invention comprises a pressurized water nuclear reactor in combination with the thimble removal tool described above. The PWR includes a reactor vessel, a core, a seal table and at least one detector thimble slidably inserted through the reactor vessel and into the core. The tool is disposed externally to the reactor vessel and comprises first pulling means for extracting the thimble from the reactor vessel by pulling the thimble up through the seal table.

A method for removing the detector thimble from the reactor vessel comprises the steps of pulling a first end of the thimble up through the seal table, severing a first portion of the thimble, and pulling and severing successive portions of the thimble until the thimble is extracted from the reactor vessel.

BRIEF DESCRIPTION OF THE DRAWINGS

FIG. 2b is a cross-sectional view of the gripper 30a, taken along the line 2b—2b of FIG. 2a.

FIG. 3 is a cross-sectional view of the cutter of FIG. 2a, taken along the line 3—3 of FIG. 2a.

FIG. 4 is a cross-sectional view of the lower pulling unit 10, taken along the lines 4—4 of FIG. 2a.

DETAILED DESCRIPTION OF THE PREFERRED EMBODIMENT

Figure 1:
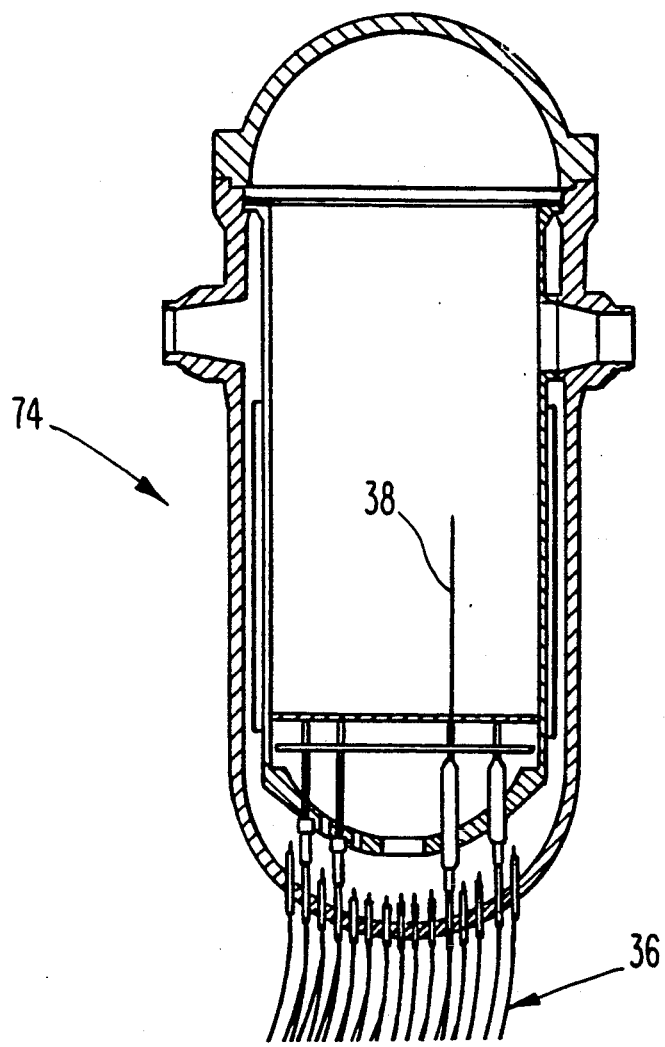
FIG. 1 is a sectional view of a reactor vessel of a pressurized water reactor (PWR).
Figure 2A:
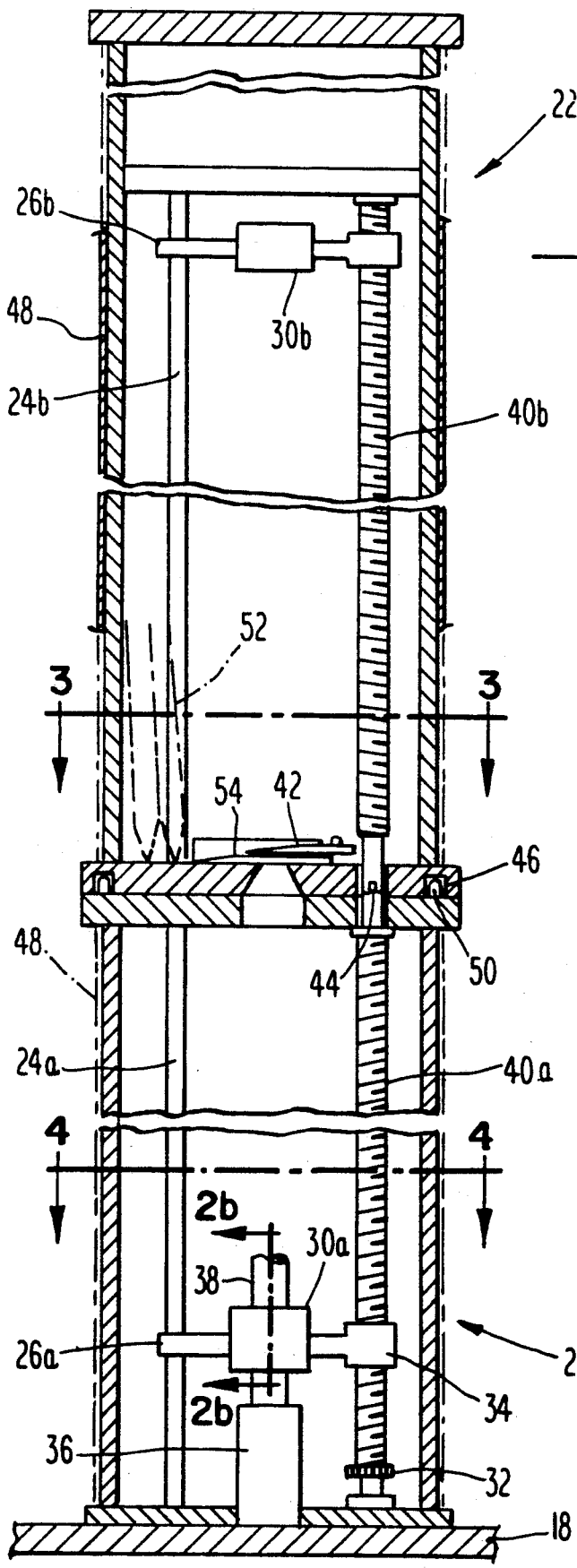
FIG. 2a depicts a flux a flux thimble removal tool in accordance with the present invention.
Figure 2B:
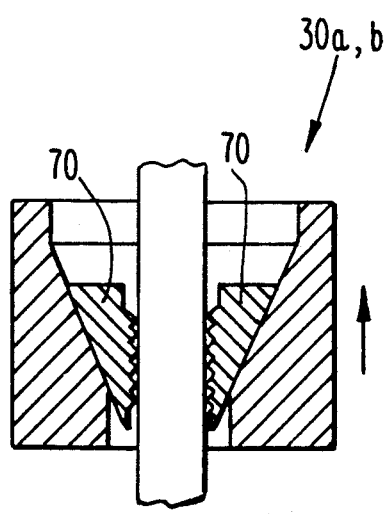
Figure 3:
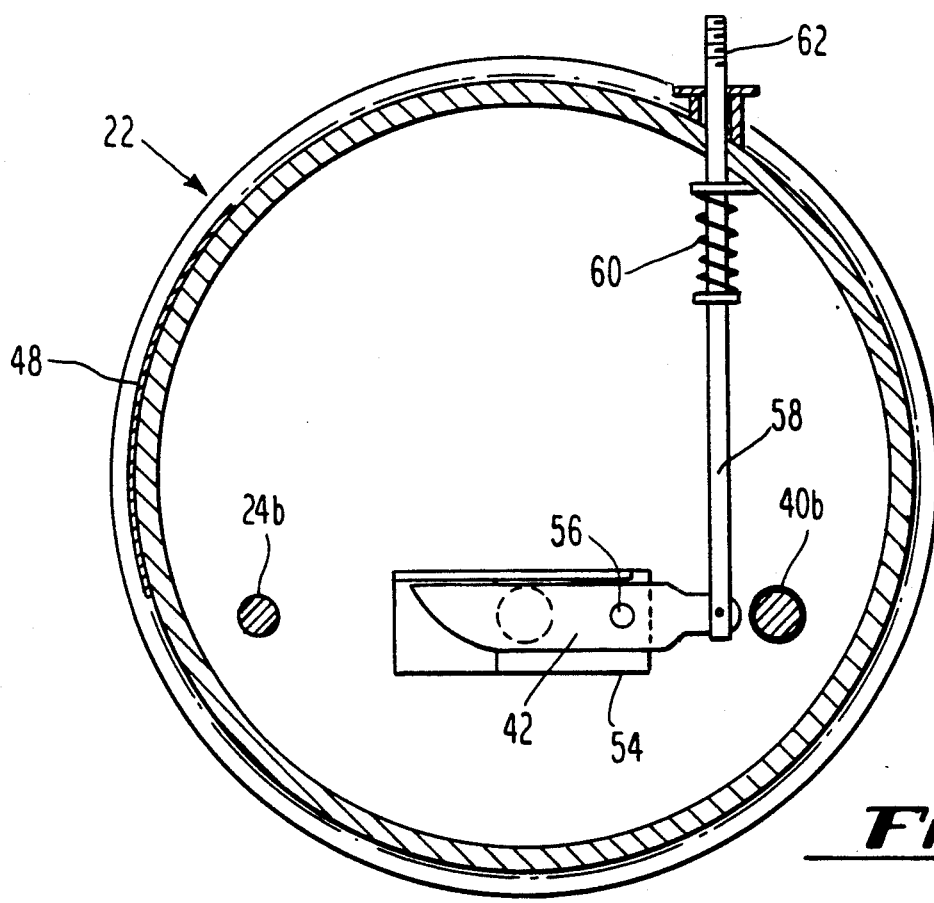
Figure 4:
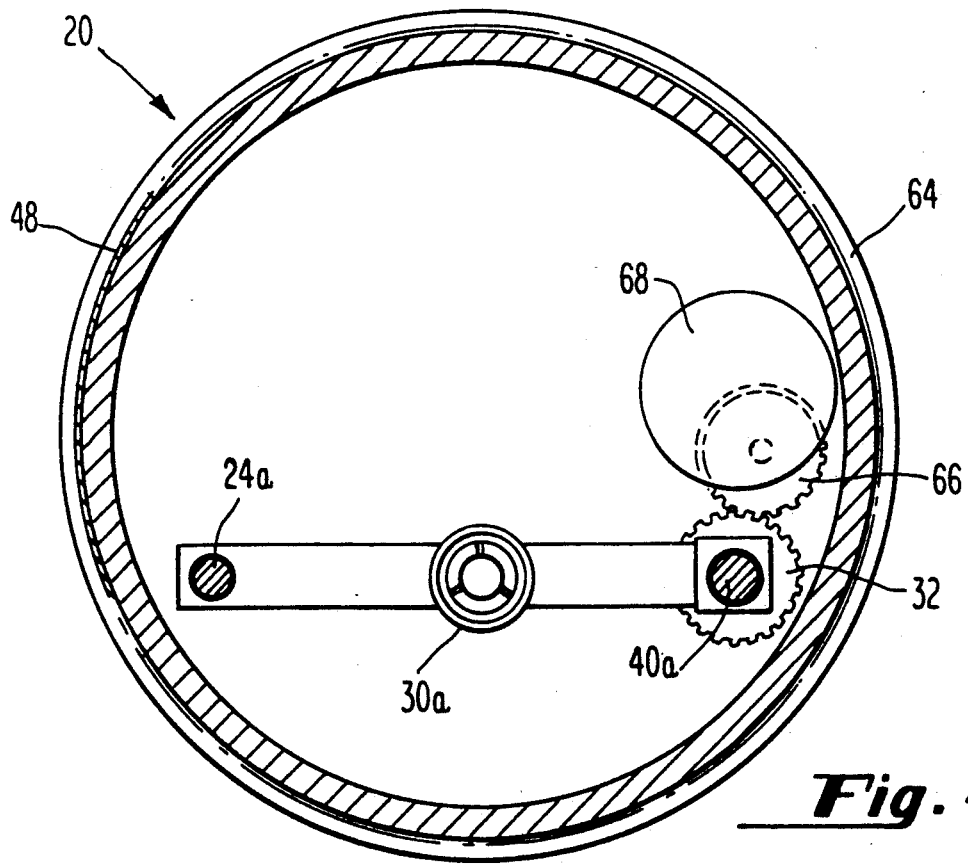
Figure 5:
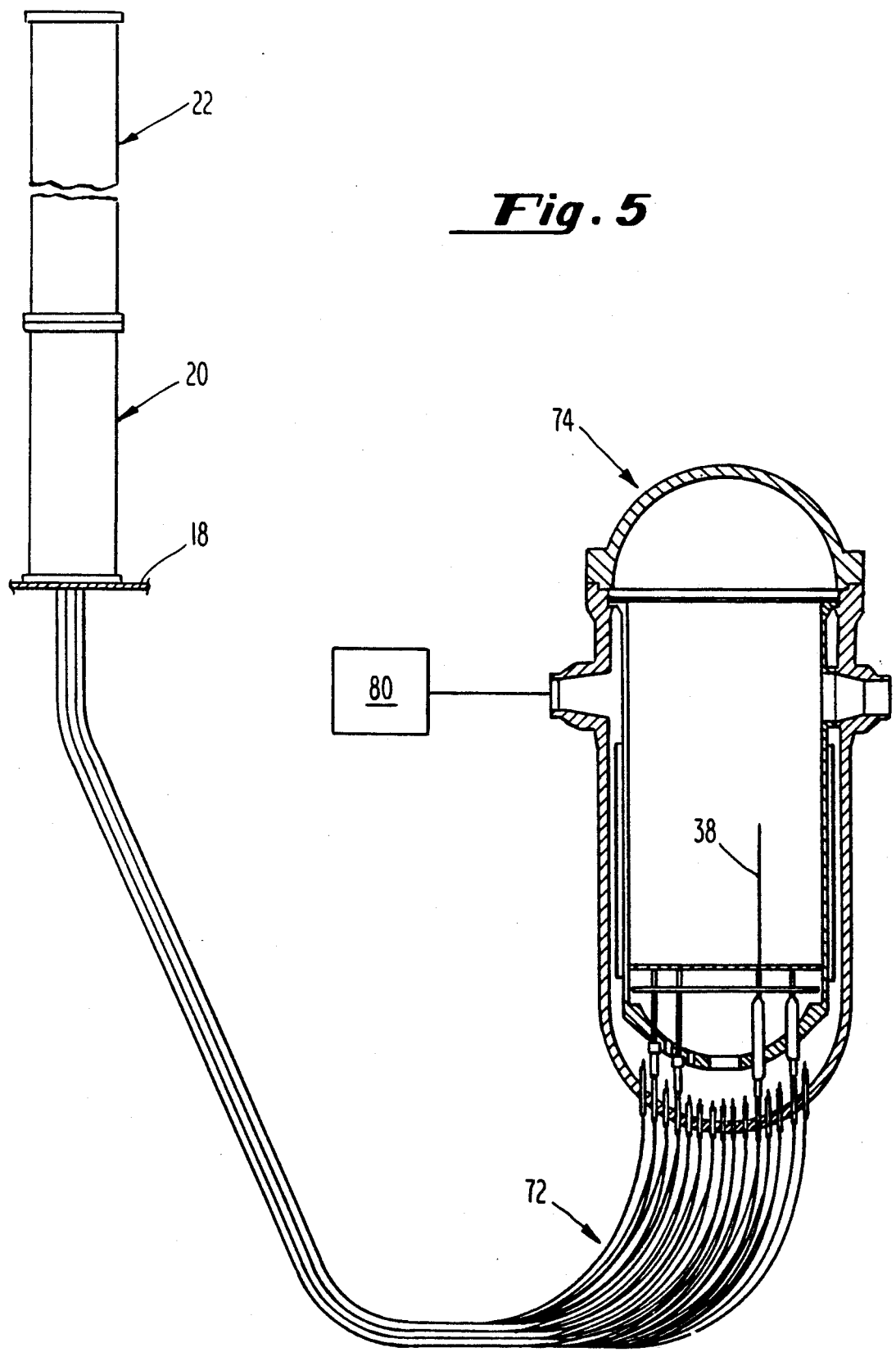
FIG. 5 depicts the flux thimble removal tool in combination with a PWR.

The preferred embodiment of the invention will now be described with reference to FIGS. 2-5, wherein like numerals represent like elements. As shown in FIGS. 2a, 4 and 5, a flux thimble removal tool in accordance with the present invention includes two basic units: a lower pulling unit 20 and a cutting/storage unit 22 that sits atop the lower pulling unit. Pulling unit 20 houses a gripper unit 30a, drive motor 68, gears 32, 66, helix drive shaft 40a (all of which are shown in FIG. 4), guide bar 26a, slide bar 24a, and guide tube 36, all of which are adapted to gradually extract neutron flux thimbles 38 one a time from the RV 74 (see FIG. 5) of a PWR, and to feed the thimble in segments to the cutting/storage unit 22. Cutting/storage unit 22 further extracts the thimble, then severs the further extracted portion. The operation is continued until the thimble is fully extracted from the RV and reduced to a quantity of easily-disposable segments. A video camera (not shown) may also be installed to facilitate surveillance of the operation. The walls of pulling unit 20 are fabricated from thin wall pipe. The respective lengths of units 20 and 22 are approximately 1 meter and 2 meters.

Cutting/storage unit 22 is coupled via sockets 46 and pins 50 to pulling unit 20. Unit 22 houses a second gripper unit 30b; second drive shaft 40b, which is coupled via a stanchion 44 to drive shaft 40a and which has threads with an equal but opposite pitch to the threads of lower drive shaft 40a; second slide bar 24b and guide 26b and removable radiation shielding 48, all of which is shown in FIG. 2a. In addition, as shown in FIG. 3, unit 22 houses a cutting unit comprising blade 42, cutter block 54, pivot pin 56, tie rod 58, compression spring 60, and connection 62 to a portable hydraulic apparatus (not shown) for activating the blade.

In operation, pulling unit 20 is mounted on the seal table 18 of the PWR, which normally serves as a pipe support (see FIG. 5); gripper 30a is then positioned to enable jaws 70 to grip the thimble; helix drive 40a is then rotated, thereby lifting the gripper and thimble upward from seal table 18. This lifting is continued until gripper 30a reaches the top of helix drive shaft 40a, at which time the top of the thimble protrudes into gripper 30b of cutting/storage unit 22. The motor 68 is then reversed, which causes lower gripper 30a to release the thimble and move downward and upper gripper 30b to take hold of the thimble and move upward, thereby pulling the thimble to the top of unit 22. Motor 68 is stopped when the thimble reaches the top of unit 22; the hydraulic apparatus (not shown) is activated to sever the thimble; and the motor is then again reversed, causing upper gripper 30b to release the severed segment and begin pulling up the next segment.

Upper unit 22 is separated from lower unit 20 after one or more thimbles are removed and is thereafter transferred to a place where the spent thimbles can be stored permanently. Both the lower and upper units are provided with removable radiation shields 48.

The flux thimble removal tool described above is unique in that it facilitates the removal, cutting and disposal of BMI flux thimbles through the seal table as opposed to through the RV; however the true scope of the invention is not limited to the specific, preferred embodiment described above. For example, the preferred embodiment may be adapted to remove thimbles inserted through the top head of the RV, and may also be adapted to remove detector thimbles other than neutron flux thimbles. Many other modifications and variations of the preferred embodiment will fall within the true scope of the invention, which is set forth in the following claims.

I claim:

1. A tool for removing a detector thimble from a reactor vessel, comprising:
   (a) first pulling means for extracting said thimble from said reactor vessel;
   (b) cutting means for severing portions of said thimble, said cutting means adapted to sever successive portions of said thimble as said is extracted from the reactor vessel; and
   (c) second pulling means for receiving said thimble after said thimble is partially extracted by said first pulling means and thereafter further extracting said thimble, second pulling means disposed on a side of said cutting means opposite said first pulling means.

2. The tool recited in claim 1, wherein said first pulling means comprises:
   (i) a first drive shaft;
   (ii) means for rotating said first drive shaft; and
   (iii) first gripper means, coupled to said first drive shaft, for gripping said thimble, said first gripper means adapted to grip and extract said thimble upon rotation of said drive shaft in a first predefined direction.

3. The tool recited in claim 2, wherein said second pulling means comprises:
   (i) a second drive shaft coupled to said first drive shaft; and
   (ii) second gripper means, coupled to said second drive shaft, for gripping said thimble, said second gripper means adapted to grip and extract said thimble upon rotation of said first and second drive shafts in a second direction opposite said first direction.

4. A pressurized water nuclear reactor (PWR), having a reactor vessel, a core, a seal table and at least one detector thimble slidably inserted through said reactor vessel and into said core, in combination with a thimble removal tool disposed externally to said reactor vessel, said tool comprising:
   (a) first pulling means for extracting said thimble, through said seal table, from said reactor vessel;
   (b) cutting means for severing portions of said thimble, said cutting means adapted to sever successive portions of said thimble as said thimble is extracted from the reactor vessel; and
   (c) second pulling means for receiving said thimble after said thimble is partially extracted by said first pulling means and thereafter further extracting said thimble, said second pulling means disposed on a side of said cutting means opposite said first pulling means.

5. The combination PWR and thimble removal tool recited in claim 4, wherein said first pulling means comprises:
  (i) a first drive shaft;
  (ii) means for rotating said first drive shaft; and
  (iii) first gripper means, coupled to said first drive shaft, for gripping said thimble, said first gripper means adapted to grip and extract said thimble upon rotation of said first drive shaft in a first predefined direction.

6. The combination PWR and thimble removal tool recited in claim 5, wherein said second pulling means comprises:
  (i) a second drive shaft coupled to said first drive shaft; and
  (ii) second gripper means, coupled to said second drive shaft, for gripping said thimble, said second gripper means adapted to grip and extract said thimble upon rotation of said first and second drive shafts in a second direction opposite said first direction.

7. The combination PWR and thimble removal tool recited in claim 5, further comprising a turbine generator operatively coupled to said PWR.

8. The combination PWR and thimble removal tool recited in claim 6, further comprising a turbine generator operative coupled to said PWR.

* * * * *